United States Patent [19]

Karpiloff

[11] Patent Number: 4,511,416

[45] Date of Patent: Apr. 16, 1985

[54] METHOD FOR MAKING DECORATED BATTERY CASINGS

[75] Inventor: Kenneth M. Karpiloff, New Rochelle, N.Y.

[73] Assignee: Duracell Inc., Bethel, Conn.

[21] Appl. No.: 564,068

[22] Filed: Dec. 21, 1983

Related U.S. Application Data

[63] Continuation-in-part of Ser. No. 328,566, Dec. 8, 1981, Pat. No. 4,436,777.

[51] Int. Cl.³ .............................................. B32B 31/12
[52] U.S. Cl. ........................................ 156/69; 53/563; 53/585; 156/233; 156/240; 156/277; 156/294; 428/36; 429/176
[58] Field of Search ............... 29/623.1, 623.4; 53/49, 53/442, 557, 563, 585; 156/69, 84, 86, 277, 294, 233, 240; 264/230, 342 R; 428/36, 203, 206, 910; 429/167, 176

[56] References Cited

U.S. PATENT DOCUMENTS

| 3,630,783 | 12/1971 | Przybyla | 429/167 X |
| 4,232,077 | 11/1980 | Meisel | 156/240 X |
| 4,343,670 | 8/1982 | Brown | 156/233 |

*Primary Examiner*—Robert Dawson
*Attorney, Agent, or Firm*—Ronald S. Cornell; Israel Nissenbaum

[57] ABSTRACT

A method for making decorated battery casings wherein a thin walled plastic tubing such as of heat shrinkable material is cut to size, placed on a support member such as a mandrel, and is then decorated with a metallic foil decorative material by hot stamping. A transparent protective film coating is then placed thereon and the tube is heat crimped at one end. The casing is placed upon a cell or battery and heat crimped at the other end to complete the battery or cell encasing procedure. The procedure is particularly efficacious in providing metallic decorated plastic battery casings.

5 Claims, 1 Drawing Figure

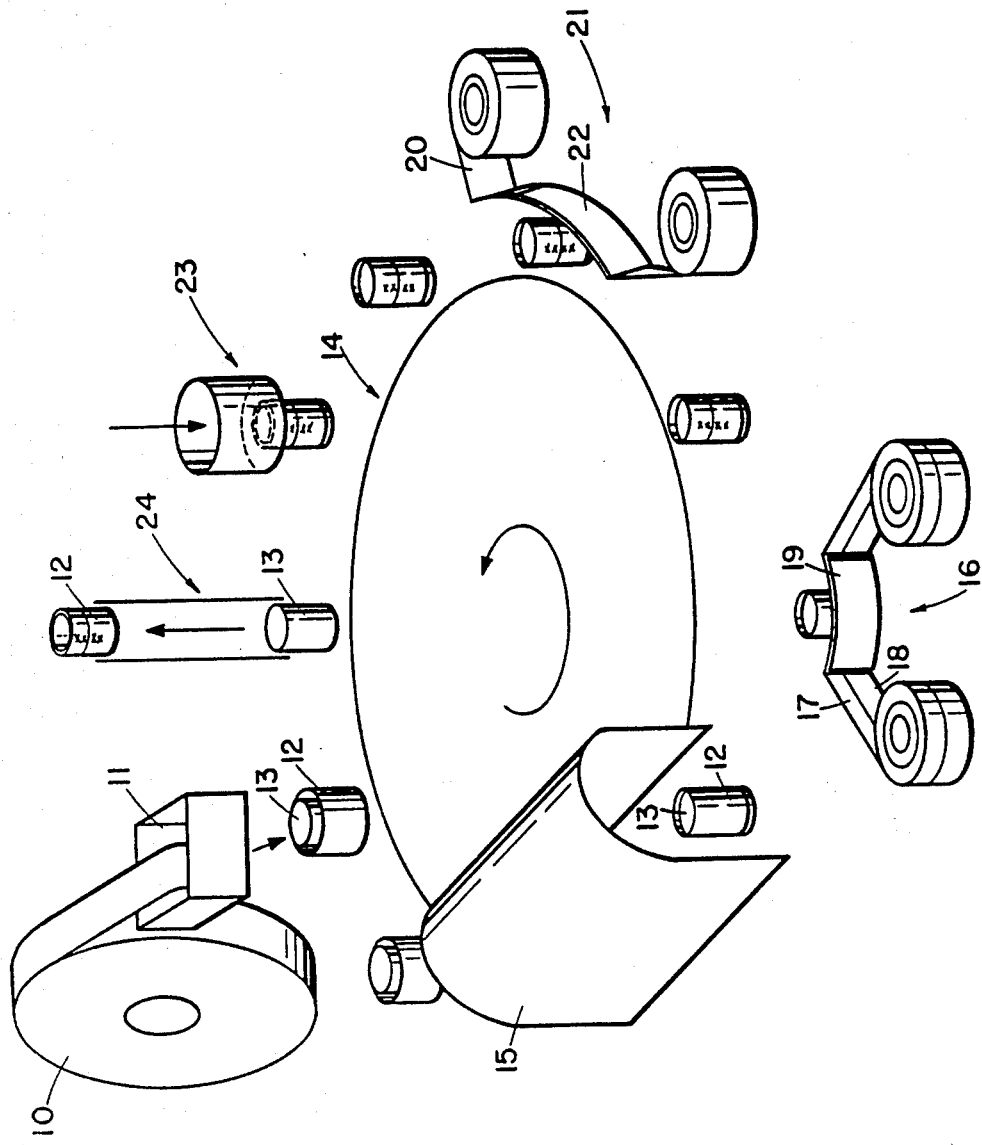

METHOD FOR MAKING DECORATED BATTERY CASINGS

This is a continuation-in-part of co-pending application Ser. No. 328,566 filed on Dec. 8, 1981, now U.S. Pat. No. 4,436,777.

The present invention relates to methods for making battery casings, particularly those comprised of plastic and having decorative labeling thereon.

Battery or cells are generally constructed, in the most commonly utilized varieties, with metallic containers enclosing the generally corrosive cell components. The metallic container is then enclosed with a printed decorative outer casing or decorative labels are affixed thereto for consumer appeal, informative notices, trademark identification and the like. The outer casings have generally been comprised of cardboard for the less expensive Leclanche cells or metal for the costlier alkaline cells. Plastic casings have also been utilized and have generally been made of relatively thick materials such as ABS (acrylonitrile-butadiene-styrene) having structural integrity. Heat shrink plastics such as unprinted or preprinted PVC (polyvinylchloride) have occasionally been utilized but with the disadvantage that such materials when heat shrunk on the battery or cell conformed to every imperfection in the underlying materials or container thereby forming an unsightly package.

For applications wherein the decorative materials are metallic obviously the most preferred casing material is metal. In practice however, preprinted metallic coated plastic heat shrink materials tend to distort when shrunk onto cells or batteries. Metal casing, however, have several disadvantages, not least of which is the high cost thereof. The metal casings, because of their electrical conductivity and their proximity to the electrical cell must be properly insulated therefrom in order to reduce the possibility of short circuits between the cell or battery terminals. Furthermore, the metal used in such casings is relatively thick thereby reducing, within specified cell dimension parameters, available volume for the active cell materials.

It is an object of the present invention to provide an economical method for making decorated battery or cell casings which are resistant to mechanical and chemical degradation.

It is a further object of the present invention to provide such method wherein the battery or cell casings are comprised of plastic with decorative metallics thereon.

It is a still further object of the present invention to provide such thin plastic in place of metallic casings whereby available cell volume is increased and cell capacity may be enhanced.

These and other objects, features and advantages of the present invention will become more apparent from the following discussion as well as the drawing in which the single FIGURE schematically depicts the operative and optional steps of the present invention and the apparatus which may be utilized in carrying out such steps.

Generally, the present invention comprises the making of metallic decorated battery or cell casings (and to such casings themselves), wherein a thin walled plastic tubing of proper dimensions is positioned on a supporting member or mandrel. The mandrel is preferably slightly larger (on the order of about 0.002" (0.005 cm) is generally sufficient) than the cell to facilitate emplacement of the tube on the cell after removal from the mandrel. The tubing may be seamed, unseamed, oval and the like, with the unseamed being preferred because of aesthetic considerations. While the tubing is on the mandrel it is decorated with a metal foil by hot stamping. The outer surface of the tube, including the metal foil, is then coated with a transparent protective film, optionally crimped at one end to enhance structural integrity, and removed from the mandrel for final placement on the battery or cell. The other end of the casing is the crimped (generally with the use of heat to soften the tube) to complete the encasing procedure. In one embodiment of the present invention, wherein the tube is of a heat shrink material, the casing is heat shrunk prior to emplacement on the battery or cell (hereinafter the term battery will include both battery and cell). In this way imperfections of the battery are not made visible in the casing as in prior art batteries. Alternatively, the use of thicker or more rigid plastics of the same dimensions instead of a heat shrinkable plastic can similarly obviate such unsightly imperfections. Furthermore, the method of the present invention can be completely and therefore economically automated.

One embodiment of the procedure of the present invention is more clearly illustrated in the drawing wherein flat unseamed heat shrinkable tubing such as of PVC is fed from roll stock 10 to a cutting and opening device 11 wherein the tubing is cut to pre-determined dimensions and opened. The sized and opened tubing 12 is then placed on a mandrel 13 which is part of a rotating dial 14 having operational indexed stations therearound. The mandrel 13 with sized tubing 12 thereon initially passes through heat shrink tunnel station 15 wherein the tubing 12 is preshrunk to the requisite final battery casing dimensions. This is in contrast to the prior art heat shrink encasing procedures in which the material is initially heat shrunk on the battery itself. Alternatively, the mandrel itself may be heated to effect the heat shrinking. Thereafter, the mandrel 13 with the heat shrink tubing 12 thereon passes to decoration station 16 where the heat shrunk tubing is printed and decorated such as with abutted metallic foils 17 and 18 with a pressure heat transfer (hot stamping) by die 19. Because of the thinness (e.g. 0.0002" (0.0005 cm)) of the metallic foils and their tendency to wander relative to each other, proper guides with feeding beds (not shown) for the foils are required in order to maintain proper registry of the die imprintation. Depending upon the heat shrinkable material utilized and the degree of heat shrinking necessary, the hot stamping itself may be utilized to effect the heat shrinking when only minimal shrinkage is required.

Application of a chemically resistant transparent coating 20 to the decorated tubing 12 takes place at the next operative station 21 by a similar hot stamping with die 22. The coating 20 is applied to prevent mechanical and chemical degradation of the relatively fragile metallic foil decoration. Accordingly, the coating 20 which is used will be selected for its resistance to the common corrosive chemical components contained within batteries such as KOH found in alkaline batteries and dimethoxyethane found in $LiMnO_2$ batteries. With the application of the protective coating 20, the metallic foil decoration is also thereby rendered isolated from possible electrical shorting with the battery components. If the decoration of the tubing 12 is not of a fragile nature such as the aforementioned metallic foils, such coating step may be an optional procedure, to protect the ink on the printed tubing 12 or the heat shrink material itself.

After the application of the protective coating 20, the mandrel with preshrunk, decorated and coated tubing 12 is indexed to crimping station 23 where the tubing is partially raised from the mandrel and crimped at one end with heat facilitating such crimping. The crimping is optional but preferred to enhance structural integrity and rigidity of the thin tube and to facilitate later battery encasing by providing a stop for the battery within the casing. The preshrunk, decorated, coated and crimped tube 12 is thereafter indexed to ejection station 24 where it is ejected and only then used to complete the fixed encasing or enclosure of a battery by heat crimping the other end. To facilitate the ejection the mandrel is initially formed of or coated with a material, such as polytetrafluoroethylene (PTFE), having a low coefficient of friction.

Because of the thinness of the tubing and decorative coatings as compared to metal (the tubing may be up to about half the thickness) more cell volume is available for active materials.

Typical heat shrink materials utilizable for the tubing in the present invention include in addition to PVC, polyolefins such as poly-ethylene, and polypropylene; polyvinylidene chloride; polyester; nylon etc. Non-heat shrinkable materials include ABS, polystyrene and the like.

Protective coating materials include thin films, e.g. (0.0002" (0.0005 cm)) of the aforementioned materials suitable for the heat shrinkable tubing.

If desired the tubing may form an additional seal for the battery. For example, the battery top may be peripherally coated with a sealant such that upon heat crimping of the tubing thereon a seal is formed thereby.

To facilitate decorative coloration of the tubing it will preferably be of such color that it forms a base coloration for a major part of the decorative jacket. For example, current batteries marketed under the Duracell ® trademark, for the most part, have the configuration of copper (an exclusively metallic color) and black bands, with black and silver (metallic) imprinting. Thus, in accordance with the above procedure, at decoration station 16 the metallic foils 17 and 18 are copper and silver colored and the base material is black in order to provide the requisite casing decorations.

It is understood that the drawing and the preceeding discussion are illustrative of the method of the present invention and that changes in apparatus, materials and procedural operations are possible without departing from the scope of the present invention as defined in the following claims.

What is claimed is:

1. A method for making a metallic decorated battery casing from a tubular plastic enclosure member characterized in that said method comprises the steps of placing said enclosure member on a support member, decorating the outer surface of said enclosure member while on said support member by hot stamping a metallic foil thereon, covering said metallic foil decoration with a transparent protective film coating, removing said decorated enclosure member from said support member, and fixedly enclosing a battery therewithin by placing said battery in said decorated tube and heat crimping at least one end of said tubular enclosure member.

2. The method of claim 1 wherein said one end of said tubular enclosure member is heat crimped prior to placement of said battery within said tubular member.

3. The method of claim 1 wherein said protective film coating is resistant to KOH.

4. The method of claim 1 wherein said plastic enclosure member is comprised of a material selected from the group consisting of PVC, polyethylene, polypropylene, polyvinylidene chloride, polyester, nylon, ABS and polystyrene.

5. The method of claim 1 wherein said protective film coating is comprised of a member of the group consisting of PVC, polyethylene, polypropylene, polyvinylidene chloride, polyester and nylon.

* * * * *